(12) United States Patent
Zukowski et al.

(10) Patent No.: US 11,797,483 B2
(45) Date of Patent: *Oct. 24, 2023

(54) DATA PRUNING BASED ON METADATA

(71) Applicant: Snowflake Inc.

(72) Inventors: Marcin Zukowski, San Mateo, CA (US); Benoit Dageville, Foster City, CA (US); Thierry Cruanes, San Mateo, CA (US); Ashish Motivala, Foster City, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,620

(22) Filed: Mar. 16, 2022

(65) Prior Publication Data

US 2022/0206992 A1    Jun. 30, 2022

Related U.S. Application Data

(63) Continuation of application No. 17/141,165, filed on Jan. 4, 2021, now Pat. No. 11,294,861, which is a
(Continued)

(51) Int. Cl.
*G06F 16/00* (2019.01)
*G06F 16/16* (2019.01)
(Continued)

(52) U.S. Cl.
CPC ......... *G06F 16/162* (2019.01); *G06F 16/215* (2019.01); *G06F 16/22* (2019.01); *G06F 16/24544* (2019.01); *G06F 16/9535* (2019.01)

(58) Field of Classification Search
CPC ...... G06F 16/162; G06F 16/164; G06F 16/22; G06F 16/215; G06F 16/24544; G06F 16/935

See application file for complete search history.

(56) References Cited

U.S. PATENT DOCUMENTS

| 5,787,466 A | 7/1998 | Berliner |
| 6,490,590 B1 | 12/2002 | Fink |
(Continued)

FOREIGN PATENT DOCUMENTS

| CN | 102496060 A | 6/2012 |
| CN | 203261358 U | 10/2013 |
(Continued)

OTHER PUBLICATIONS

Azza Abouzeid, et al., "HadoopDB," Proceedings of the VLDB Endowment, ACM Digital Library, Assoc. of Computing Machinery, New York, NY, vol. 2, No. 1 (Aug. 2009).
(Continued)

*Primary Examiner* — Leslie Wong
(74) *Attorney, Agent, or Firm* — Womble Bond Dickinson (US) LLP

(57) ABSTRACT

A system and method for pruning data based on metadata. The method may include receiving a query that includes a plurality of predicates and identifying one or more applicable files including database data satisfying at least one of the plurality of predicates. The identifying the one or more applicable files including reading metadata stored in a metadata store that is separate from the database data. The method further includes pruning inapplicable files including database data that does not satisfy at least one of the plurality of predicates to create a reduced set of files and reading the reduced set of files to execute the query.

24 Claims, 8 Drawing Sheets

Related U.S. Application Data continuation of application No. 16/861,516, filed on Apr. 29, 2020, now Pat. No. 11,163,724, which is a continuation of application No. 16/688,888, filed on Nov. 19, 2019, now Pat. No. 10,678,753, which is a continuation of application No. 16/399,448, filed on Apr. 30, 2019, which is a continuation of application No. 15/210,536, filed on Jul. 14, 2016, now Pat. No. 10,437,780.

(51) Int. Cl.
   *G06F 16/22*     (2019.01)
   *G06F 16/215*    (2019.01)
   *G06F 16/9535*   (2019.01)
   *G06F 16/2453*   (2019.01)

(56) References Cited

U.S. PATENT DOCUMENTS

| | | | |
|---|---|---|---|
| 6,757,689 B2 | 6/2004 | Battas | |
| 6,957,225 B1* | 10/2005 | Zait | G06F 16/24557 |
| | | | 707/999.102 |
| 6,965,891 B1* | 11/2005 | Jakobsson | G06F 16/2264 |
| | | | 707/999.005 |
| 7,280,998 B1 | 10/2007 | Aboujaoude | |
| 7,313,554 B2* | 12/2007 | Chen | G06F 16/24568 |
| | | | 707/999.003 |
| 7,738,454 B1 | 6/2010 | Panwar et al. | |
| 7,823,009 B1 | 10/2010 | Tormasov | |
| 8,290,972 B1 | 10/2012 | Deshmukh et al. | |
| 8,301,650 B1 | 10/2012 | Oliver | |
| 8,341,363 B2 | 12/2012 | Chou | |
| 8,381,015 B2 | 2/2013 | Kaminski | |
| 8,417,746 B1* | 4/2013 | Gillett, Jr. | G06F 16/14 |
| | | | 707/829 |
| 8,428,087 B1 | 4/2013 | Vincent | |
| 8,484,259 B1 | 7/2013 | Makkar et al. | |
| 8,516,159 B2 | 8/2013 | Ananthanarayanan | |
| 8,516,355 B2 | 8/2013 | Gale | |
| 8,560,887 B2 | 10/2013 | Behrendt | |
| 8,640,137 B1 | 1/2014 | Bostic et al. | |
| 8,706,914 B2 | 4/2014 | Duchesneau | |
| 8,725,875 B2 | 5/2014 | Supalov | |
| 9,043,372 B2* | 5/2015 | Makkar | G06F 16/907 |
| | | | 707/827 |
| 9,244,976 B1 | 1/2016 | Zhang et al. | |
| 9,462,056 B1* | 10/2016 | Protopopov | H04L 67/567 |
| 9,740,797 B2 | 8/2017 | Nyang | |
| 9,971,831 B2* | 5/2018 | Chainani | G06F 16/335 |
| 10,013,466 B2* | 7/2018 | Zimmerer | G06F 16/2477 |
| 10,095,738 B1* | 10/2018 | Caldwell | G06F 16/9535 |
| 10,127,251 B2* | 11/2018 | Deshpande | G06F 16/219 |
| 10,331,670 B2* | 6/2019 | Boehme | G06F 16/2455 |
| 10,437,780 B2* | 10/2019 | Zukowski | G06F 16/24544 |
| 10,678,753 B2* | 6/2020 | Zukowski | G06F 16/9535 |
| 11,163,724 B2* | 11/2021 | Cruanes | G06F 16/162 |
| 11,294,861 B2* | 4/2022 | Cruanes | G06F 16/162 |
| 2002/0120630 A1 | 8/2002 | Christianson et al. | |
| 2003/0158884 A1 | 8/2003 | Alford, Jr. | |
| 2003/0177239 A1 | 9/2003 | Shinohara et al. | |
| 2004/0167904 A1 | 8/2004 | Wen et al. | |
| 2005/0021758 A1 | 1/2005 | White | |
| 2005/0210049 A1 | 9/2005 | Foster | |
| 2006/0059171 A1 | 3/2006 | Borthakur et al. | |
| 2006/0059173 A1 | 3/2006 | Hirsch et al. | |
| 2006/0074872 A1 | 4/2006 | Gordon | |
| 2007/0106655 A1* | 5/2007 | Petri | G06F 16/168 |
| | | | 707/E17.14 |
| 2007/0162426 A1* | 7/2007 | Brown | G06Q 30/0283 |
| 2007/0198656 A1 | 8/2007 | Mazzaferri et al. | |
| 2007/0239681 A1* | 10/2007 | Krishnaprasad | G06F 16/81 |
| 2007/0276861 A1 | 11/2007 | Pryce et al. | |
| 2008/0027788 A1 | 1/2008 | Lawrence et al. | |
| 2008/0027965 A1 | 1/2008 | Garret et al. | |
| 2009/0043993 A1 | 2/2009 | Ford et al. | |
| 2009/0182836 A1 | 7/2009 | Aviles et al. | |
| 2009/0187542 A1* | 7/2009 | Begley | G06F 16/907 |
| 2009/0216910 A1 | 8/2009 | Duchesneau | |
| 2009/0254516 A1 | 10/2009 | Meiyyappan et al. | |
| 2009/0254532 A1 | 10/2009 | Yang et al. | |
| 2009/0300043 A1 | 12/2009 | Maclennan | |
| 2010/0005054 A1 | 1/2010 | Smith et al. | |
| 2010/0031267 A1 | 2/2010 | Maessen et al. | |
| 2010/0082648 A1 | 4/2010 | Potapov et al. | |
| 2010/0100888 A1 | 4/2010 | Tene et al. | |
| 2010/0145929 A1 | 6/2010 | Burger | |
| 2010/0179940 A1 | 7/2010 | Gilder et al. | |
| 2010/0199042 A1 | 8/2010 | Bates | |
| 2010/0235344 A1* | 9/2010 | Chandrasekar | G06F 16/8365 |
| | | | 707/E17.054 |
| 2011/0145307 A1 | 6/2011 | Ananthanarayanan et al. | |
| 2011/0161488 A1 | 6/2011 | Anderson et al. | |
| 2011/0225167 A1 | 9/2011 | Bhattacharjee et al. | |
| 2011/0246503 A1* | 10/2011 | Bender | G06F 16/258 |
| | | | 707/769 |
| 2011/0320187 A1* | 12/2011 | Motik | G06F 16/3344 |
| | | | 704/9 |
| 2012/0005307 A1 | 1/2012 | Das et al. | |
| 2012/0059823 A1* | 3/2012 | Barber | G06F 16/328 |
| | | | 707/E17.089 |
| 2012/0101860 A1 | 4/2012 | Ezzat | |
| 2012/0109888 A1 | 5/2012 | Zhang et al. | |
| 2012/0110570 A1 | 5/2012 | Jacobson | |
| 2012/0166771 A1 | 6/2012 | Ringseth | |
| 2012/0173824 A1* | 7/2012 | Iyigun | G06F 12/0866 |
| | | | 711/E12.019 |
| 2012/0204187 A1 | 8/2012 | Breiter et al. | |
| 2012/0209873 A1* | 8/2012 | He | G06F 16/2237 |
| | | | 707/769 |
| 2012/0233315 A1 | 9/2012 | Hoffman | |
| 2012/0260050 A1 | 10/2012 | Kaliannan | |
| 2012/0265881 A1 | 10/2012 | Chen | |
| 2012/0294307 A1 | 11/2012 | Fujihira et al. | |
| 2012/0296883 A1 | 11/2012 | Ganesh et al. | |
| 2012/0296913 A1* | 11/2012 | Ash | G06F 16/316 |
| | | | 707/E17.083 |
| 2012/0311065 A1 | 12/2012 | Ananthanarayanan et al. | |
| 2012/0323971 A1* | 12/2012 | Pasupuleti | G06F 16/217 |
| | | | 707/E17.055 |
| 2013/0007753 A1 | 1/2013 | Jain | |
| 2013/0013606 A1* | 1/2013 | Stanfill | G06F 16/213 |
| | | | 707/E17.002 |
| 2013/0031229 A1 | 1/2013 | Shiga | |
| 2013/0124545 A1 | 4/2013 | Holmberg et al. | |
| 2013/0110778 A1 | 5/2013 | Taylor et al. | |
| 2013/0110961 A1 | 5/2013 | Jadhav | |
| 2013/0132967 A1 | 5/2013 | Soundararajan | |
| 2013/0145375 A1* | 6/2013 | Kang | G06F 9/5083 |
| | | | 718/104 |
| 2013/0151884 A1 | 6/2013 | Hsu | |
| 2013/0166557 A1* | 6/2013 | Fricke | G06F 16/2471 |
| | | | 707/E17.089 |
| 2013/0174146 A1 | 7/2013 | Dasgupta | |
| 2013/0205028 A1 | 8/2013 | Crockett et al. | |
| 2013/0205092 A1 | 8/2013 | Roy et al. | |
| 2013/0218837 A1 | 8/2013 | Bhatnagar | |
| 2013/0282795 A1 | 10/2013 | Tsao | |
| 2013/0332614 A1 | 12/2013 | Brunk | |
| 2013/0346444 A1* | 12/2013 | Makkar | G06F 16/907 |
| | | | 707/770 |
| 2014/0025638 A1 | 1/2014 | Hu | |
| 2014/0059226 A1 | 2/2014 | Messerli | |
| 2014/0095646 A1 | 4/2014 | Chan | |
| 2014/0109095 A1 | 4/2014 | Farkash | |
| 2014/0115091 A1 | 4/2014 | Lee | |
| 2014/0136473 A1 | 5/2014 | Faerber | |
| 2014/0149461 A1 | 5/2014 | Wijayaratne | |
| 2014/0279955 A1* | 9/2014 | Gavage | G06F 16/215 |
| | | | 707/692 |
| 2014/0280249 A1* | 9/2014 | Marwah | G06F 16/2219 |
| | | | 707/754 |

(56) References Cited

U.S. PATENT DOCUMENTS

| | | | |
|---|---|---|---|
| 2014/0325115 A1* | 10/2014 | Ramsundar | G06F 3/0688 |
| | | | 711/163 |
| 2015/0088903 A1 | 3/2015 | Konik et al. | |
| 2015/0088924 A1 | 3/2015 | Abadi | |
| 2015/0205834 A1* | 7/2015 | Keeton | G06F 16/14 |
| | | | 707/760 |
| 2015/0286681 A1* | 10/2015 | Baer | G06F 16/2282 |
| | | | 707/754 |
| 2015/0363167 A1* | 12/2015 | Kaushik | G06F 16/221 |
| | | | 707/753 |
| 2015/0365385 A1* | 12/2015 | Hore | H04L 63/0428 |
| | | | 713/152 |
| 2016/0055192 A1* | 2/2016 | Bensberg | G06F 16/2282 |
| | | | 707/755 |
| 2016/0224685 A1 | 8/2016 | Nyang | |
| 2016/0350347 A1* | 12/2016 | Das | G06F 16/258 |
| 2017/0017673 A1* | 1/2017 | Kirk | G06F 16/24542 |
| 2017/0017684 A1* | 1/2017 | Zhou | G06F 16/24556 |
| 2017/0046394 A1* | 2/2017 | Skidanov | G06F 16/2379 |
| 2017/0103116 A1* | 4/2017 | Hu | G06F 16/2272 |
| 2017/0308572 A1* | 10/2017 | Finlay | G06F 16/2453 |
| 2018/0246950 A1* | 8/2018 | Arye | G06F 16/27 |
| 2020/0167315 A1* | 5/2020 | Dageville | G06F 16/2456 |

FOREIGN PATENT DOCUMENTS

| | | |
|---|---|---|
| JP | 2013242915 A | 5/2013 |
| WO | 2006/026659 A2 | 3/2006 |
| WO | 2008/063973 A2 | 5/2008 |
| WO | 2013/006157 A1 | 1/2013 |
| WO | 2013/072232 A1 | 5/2013 |
| WO | 2013/084078 A1 | 6/2013 |

OTHER PUBLICATIONS

Sergey Melnik et al. "Dremel: Interactive Analysis of Web-Scale Datasets", Proceedings of the VLDB Endowment, vol. 3, 2010,Jan. 1, 2010, pp. 330-339, XP055315345, New York.

David A Maluf et al: "NASA Technology Transfer System", Space Mission Challenges for Information Technology (SMC-IT), 2011 IEEE Fourth International Conference On, IEEE, Aug. 2, 2011 (Aug. 2, 2011), pp. 111-117.

* cited by examiner

FILE1
1977-02-04 | Jack Walsh
1975-12-02 | Andy Brit
1981-05-21 | Jennifer Star
1983-03-08 | Brandon Quelley
NULL       | John Smith records: 5
birthday: [1975-12-02 .. 1983-03-08]
birthday_nulls: 1
name: (Andy Brit..John Smith)
name_nulls: 0
name_ascii: yes

FIG. 2A

FILE2
1985-03-12 | Thierry Bandar
1983-04-09 | John Dali
1986-05-21 | Sándor Dutch records: 3
birthday: [1974-03-12 .. 1983-03-08]
birthday_nulls: 0
name: (John Dali .. Thierry Bandar)
name_nulls: 0
name_ascii: no

FIG. 2B

FILE3
1971-01-29 | Claudio Bruno
1979-11-22 | Matt Spark
1978-03-15 | Kurt Zar
1975-10-02 | Johnny Black records: 4
birthday: [1971-01-29 .. 1979-11-22]
birthday_nulls: 0
name: (Claudio Bruno .. Matt Spark)
name_nulls: 0
name_ascii: Yes

FIG. 2C

DATA PRUNING BASED ON METADATA

CROSS-REFERENCE TO RELATED APPLICATIONS

This is a continuation of U.S. patent application Ser. No. 17/141,165 filed Jan. 4, 2021, titled "Data Pruning Based on Metadata," which is a continuation of U.S. patent application Ser. No. 16/861,516, filed Apr. 29, 2020, titled "Data Pruning Based on Metadata," issued as U.S. Pat. No. 11,163,724 on Nov. 2, 2021, which is a continuation of U.S. patent application Ser. No. 16/688,888, filed Nov. 19, 2019, titled "Data Pruning Based on Metadata," issued as U.S. Pat. No. 10,678,753 on Jun. 9, 2020, which is a continuation of U.S. patent application Ser. No. 16/399,448, filed Apr. 30, 2019, titled "Data Pruning Based on Metadata," which is a continuation of U.S. patent application Ser. No. 15/210,536, filed Jul. 14, 2016, titled "Data Pruning Based on Metadata," issued as U.S. Pat. No. 10,437,780 on Oct. 8, 2019, which are incorporated herein by reference in its entirety, including but not limited to those portions that specifically appear hereinafter, the incorporation by reference being made with the following exception: In the event that any portion of the above-referenced application is inconsistent with this application, this application supersedes the above-referenced application.

TECHNICAL FIELD

The present disclosure relates to resource management systems and methods for the management of data storage and computing resources related to data management.

BACKGROUND

When working with large volumes of data, there are often situations when only a small fraction of data is relevant for a given task. In those cases, identifying the relevant subset early increases productivity by not accessing irrelevant data and thereby results in dramatic performance improvements. Current technologies available in the computing industry focus on organizing data in a specific manner in order to achieve acceptable results. Such technologies rely on primary indices wherein a table is forced to be ordered on some dimension. The downside with this approach, however, is that maintaining strict ordering is often expensive and only a single dimension can be used for retrieval in any storage scheme.

Another common technology relies on the use of secondary indices; wherein auxiliary data structures are created that provide quick access to records that match desired criteria. A shortcoming of such systems is that they commonly result in random access patterns, are expensive to maintain with updates, and use additional disk and memory within a system. Additionally, they require user participation in order to make manual or semi-automatic decisions about what indices should be created.

Another common technology relies on table partitioning. Using this approach, a system may allow explicit partitions along certain dimensions. For example, each week can be formed into a separate subset of the data, and then filters on the used dimensions may be optimized so as to only access the relevant partitions (i.e., those that contain data from relevant ranges). A problem with this approach is that it typically only works with a relatively small number of partitions (10-100s), and requires manual tuning by an administrator.

Yet another common approach relies on Min-Max indices (also called "zone maps") to automatically maintain simple statistics (usually min/max values for all columns) about different dimensions within the data. Based on these statistics relevant ranges of data can be readily identified. This is most useful when exploiting the natural order of the data such as when the data is loaded in batches such that batches have very little overlap (as is common e.g. for time-based loading). They can also be used when there is a primary index on the data.

The systems and methods described herein provide an improved approach to data storage and data retrieval that addresses and reduces the impact of the above-identified limitations of existing systems by efficiently managing the data and data operators being processed within a data processing system.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIGS. 2A, 2B, and 2C illustrate a simplified example of a set of files having metadata consistent with the teachings and disclosures made herein.

DETAILED DESCRIPTION

Figure 1:
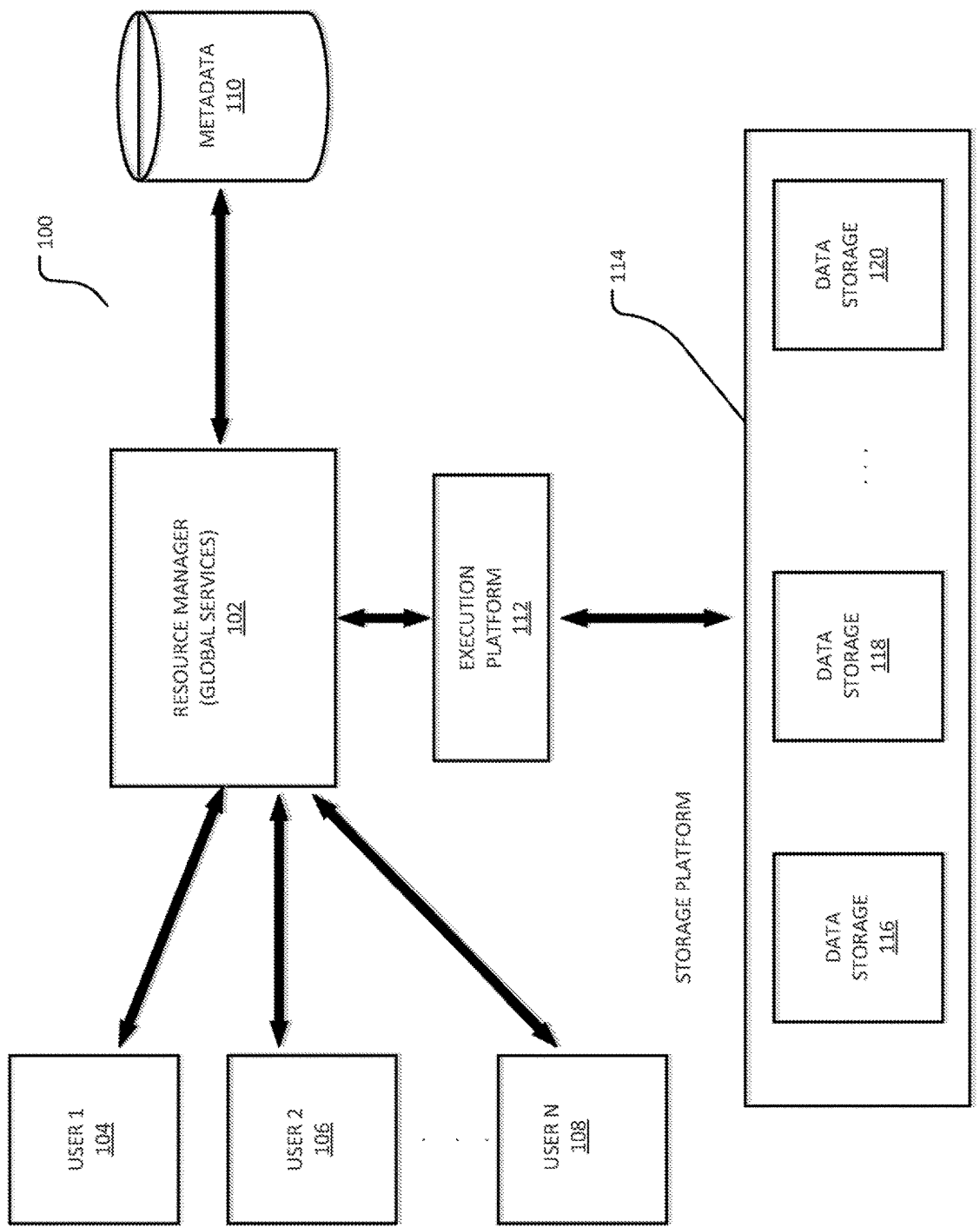
FIG. 1 is a block diagram depicting an example embodiment of the systems and methods described herein.

In the description that follows, methods, systems, and apparatuses for querying within a computing system will be discussed. For example, an implementation may begin by receiving a query directed to a set of files. The query may include a plurality of predicates and may also include a request to delete tuples in the query. The implementation may further include accessing metadata associated with the set of files that comprises the data characteristics of the set of files. Additionally, the implementation may further identify zero or more files in the set of files that do not need to be analyzed for a given query based on the metadata without accessing data in any of the files in the set of files. The implementation may further include identifying each of the plurality of predicates in the query and comparing each of the identified predicates against the metadata associated with the set of files. The implementation may delete or remove zero or more of the predicates if they are not represented within the metadata associated with the set of files to generate a revised or modified query.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example" or "an example" means that a particular feature, structure or characteristic described in connection with the embodiment or example is included in at least one embodiment of the present disclosure. Thus, appearances of the phrases "in one embodiment," "in an embodiment," "one example" or "an example" in various places throughout this specification are not necessarily all referring to the same embodiment or example. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method or computer program product. Accordingly, the present disclosure may take the form of an entirely hardware-comprised embodiment, an entirely software-comprised embodiment (including firmware, resident software, micro-code, etc.) or an embodiment combining software and hardware aspects that may all generally be referred to herein as a "circuit," "module" or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein provide a flexible and scalable data warehouse using a new data processing platform. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database using any data storage architecture and using any language to store and retrieve data within the database. The systems and methods described herein further provide a multi-tenant system that supports isolation of computing resources and data between different customers/clients and between different users within the same customer/client.

FIG. 1 is a block diagram depicting an example embodiment of a new data processing platform 100. As shown in FIG. 1, a resource manager 102 is coupled to multiple users 104, 106, and 108. In particular implementations, resource manager 102 can support any number of users desiring access to data processing platform 100. Users 104-108 may include, for example, end users providing data storage and retrieval queries and requests, system administrators managing the systems and methods described herein, software applications that interact with a database, and other components/devices that interact with resource manager 102. Resource manager 102 provides various services and functions that support the operation of all systems and components within data processing platform 100. Resource manager 102 is also coupled to metadata 110, which is associated with the entirety of data stored throughout data processing platform 100. Because the resource manager 102 is coupled with the metadata 110 corresponding to sets of files, the metadata 110 may be used for optimizing user queries. In some embodiments, metadata 110 includes a summary of data stored in remote data storage systems as well as data available from a local cache. Additionally, metadata 110 may include information regarding how data is organized in the remote data storage systems and the local caches. Metadata 110 allows systems and services to determine whether a piece of data needs to be processed without loading or accessing the actual data from a storage device.

As part of the data processing platform 100, metadata 110 may be collected when changes are made to the data using data manipulation language (DML), which changes may be made by way of any DML statement. Examples of manipulating data may include, but are not limited to, selecting, updating, changing, merging, and inserting data into tables. As part of the platform 100, files may be created and the metadata 110 may be collected on a per file and a per column basis, after which the metadata 110 may be saved in a metadata store. This collection of metadata 110 may be performed during data ingestion or the collection of metadata 110 may be performed as a separate process after the data is ingested or loaded. In an implementation, the metadata 110 may comprise a number of distinct values; a number of null values; and a minimum value and a maximum value for each file. In an implementation, the metadata may further comprise string length information and ranges of characters in strings.

Resource manager 102 is further coupled to an execution platform 112, which provides multiple computing resources that execute various data storage and data retrieval operations, as discussed in greater detail below. Execution platform 112 is coupled to multiple data storage devices 116, 118, and 120 that are part of a storage platform 114. Although three data storage devices 116, 118, and 120 are shown in FIG. 1, execution platform 112 is capable of communicating with any number of data storage devices. In some embodiments, data storage devices 116, 118, and 120 are cloud-based storage devices located in one or more geographic locations. For example, data storage devices 116, 118, and 120 may be part of a public cloud infrastructure or a private cloud infrastructure, or any other manner of distributed storage system. Data storage devices 116, 118, and 120 may be hard disk drives (HDDs), solid state drives (SSDs), storage clusters, or any other data storage technology. Additionally, storage platform 114 may include distributed file systems (such as Hadoop Distributed File Systems (HDFS)), object storage systems, and the like.

In particular embodiments, the communication links between resource manager 102 and users 104-108, metadata 110, and execution platform 112 are implemented via one or more data communication networks and may be assigned various tasks such that user requests can be optimized. Similarly, the communication links between execution platform 112 and data storage devices 116-120 in storage platform 114 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 116, 118, and 120 are decoupled from the computing resources associated with execution platform 112. This architecture supports dynamic changes to data processing platform 100 based on the changing data storage/retrieval needs as well as the changing needs of the users and systems accessing data processing platform 100. The support of dynamic changes allows data processing platform 100 to scale quickly in response to changing demands on the systems and components within data processing platform 100. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Resource manager 102, metadata 110, execution platform 112, and storage platform 114 are shown in FIG. 1 as individual components. However, each of resource manager 102, metadata 110, execution platform 112, and storage platform 114 may be implemented as a distributed system (e.g., distributed across multiple systems/platforms at multiple geographic locations). Additionally, each of resource manager 102, metadata 110, execution platform 112, and storage platform 114 can be scaled up or down (independently of one another) depending on changes to the requests received from users 104-108 and the changing needs of data processing platform 100. Thus, in the described embodiments, data processing platform 100 is dynamic and supports regular changes to meet the current data processing needs.

With reference primarily to FIGS. 2A, 2B, 2C, and FIG. 3, an implementation for the use of metadata with the processing of files within a relation, or a plurality of relations will be discussed. It will be appreciated by those in the computing fields, that metadata corresponding to a relation being processed may be used for deriving optimized values during the execution of operational processes, such as filtering and/or joins, which will greatly improve data management on large scales. FIG. 2A illustrates an example of a file that is named FILE1 and consists of name and date information. As can be seen in the figure, FILE1 comprises metadata 220*a* that describes the contents of the actual data 222*a* in the file primarily in the form of data ranges expressed in the file.

FIG. 2B illustrates an example of a file that is named FILE2 and consists of name and date information. As can be seen in the figure, FILE2 comprises metadata 220*b* that describes the contents of the actual data 222*b* in the file primarily in the form of data ranges expressed in the file.

FIG. 2C illustrates an example of a file that is named FILE3 and consists of name and date information. As can be seen in the figure, FILE3 comprises metadata 220*c* that describes the contents of the actual data 222*c* in the file primarily in the form of data ranges expressed in the file.

It will be appreciated that in an implementation, files may be used for data storage and metadata extraction. In an implementation, fixed-sized or variable-sized data segments within files may also be used. It will be appreciated that the metadata 220*a,* 220*b,* 220*c* may be derived when loading the data, and stored both with the data, for example in the file, and/or in a separate metadata store.

Figure 3:
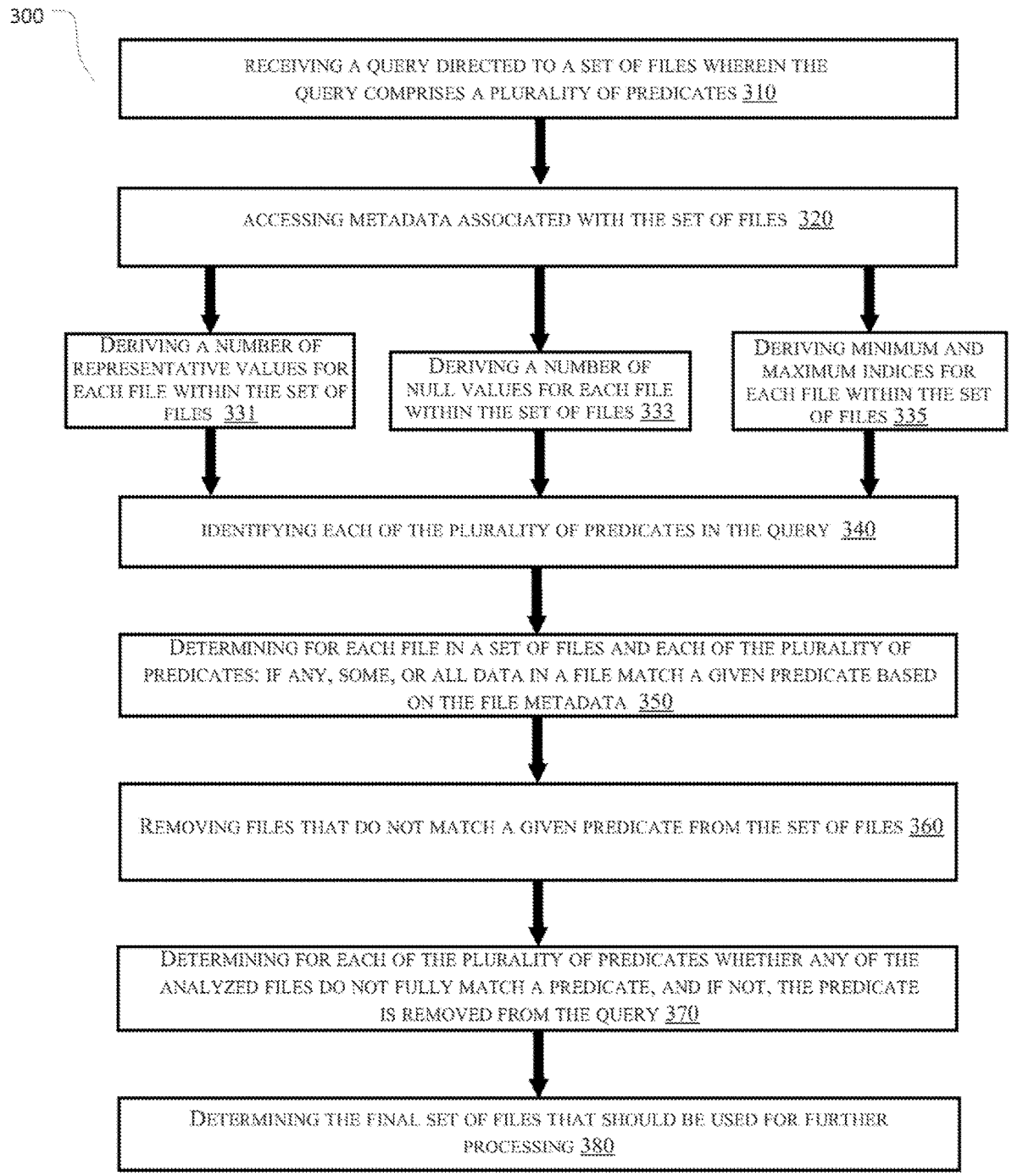
FIG. 3 illustrates a flow chart depicting an implementation of the methods disclosed herein.

During use, method 300 of FIG. 3 may receive a query directed to a set of files at 310, and wherein the query may comprise a plurality of predicates. In an implementation, each set of files may have corresponding metadata therewith that may be accessed by a processor at 320. It will be appreciated that file metadata, including disk block, chunk of data may be created, for example, automatically upon loading data into a system, or it may be created manually on command of a user, or it may even be a part of the files from the beginning (i.e., some file formats already have it).

It will be appreciated that the following metadata properties may be identified typically during the step of loading data into a system or during a separate optimization stage. At 331, representative values for each file within the set of files may be derived from the metadata. At 333, the number of null values may be derived from the metadata for each file within the set of files. At 335, maximum and minimum values may be read or derived from the metadata associated with each file in the set of files, thereby establishing a range of values that is representative of the data in the set of files. It will be appreciated that after performing the processes of 320, 331, 333, and 335, a large amount of information is known about each file within the set of files without actually accessing any of the files individually. At 340, a plurality of predicates may be identified from the query and then compared to the metadata associated with each of the files within the set of files.

At 350, the method 300 comprises determining the following for each file in a set of files and for each of the plurality of the predicates: if any, some, or all data in that file match a given or at least one predicate based on the file metadata. Specific examples of the differing types of metadata will be discussed in greater detail below in connection with FIGS. 2A-2C.

At 360, the method 300 comprises removing files that do not match a given predicate from the set of files. At 370, the method 300 comprises determining for each of the plurality of the predicates whether any of the analyzed files do not fully match a predicate, and if not, the predicate is removed from the query. At 380, the method 300 comprises determining the final set of files that should be used for further processing.

In an implementation, the method may comprise creating one or more files comprising the metadata. In an implementation, the method may further comprise collecting the metadata when there are changes made to the data on a per column and a per file basis during data ingestion or as a separate process after data is loaded. In an implementation, the method may further comprise receiving the metadata on a per column and a per file basis and storing the metadata in a metadata store.

In an implementation, the metadata of the set of files may be compared against the plurality of predicates supplied with the query. In the implementation, if the predicates are not satisfied by the metadata, or do not fall within a range defined by the metadata, then the set of files can be ignored. Alternatively, if the predicates are not satisfied by the metadata of any set of files, then the predicate may be removed from the query.

For example, if the metadata reveals that all values in all files in a column "X" are greater than 7, a filtering process "WHERE X>7" may be removed, thereby saving computing resources because the actual files or parts of files need not be processed. Additionally, if it is known that there are no null values in a set of files, the filter "IS NOT NULL" may be removed, thereby saving resources. In another implementation, it may be known that the column values are all within a range from 0 . . . 1000, a 2-byte physical representation of that column may be used to simplify all the expressions regarding data from that column.

In an implementation, columns in a file may be identified that do not need to be accessed during query processing if they are only used in predicates that have been deleted. For example, in implementation where the system only reads a subset of columns/attributes when processing a query, if a predicate is eliminated from the query, it is possible that a given column was only used by this predicate, and not by any other part of the query. In that case, this column does not need to be accessed and the expression does not need to be processed during the query execution. Consider the following in relation to the example in FIGS. 2A-2C:

1) In the case where: SELECT NAME . . . WHERE YEAR(birthday)>1970, there are only fully matched files with this predicate, hence the predicate can be eliminated.

2) In the case where: SELECT NAME YEAR (birthday)>1980 AND SUBSTR(name, 1, 1)>'K'
YEAR(birthday)>1980, matches metadata
FILE1: partially
FILE2: completely
FILE3: nothing
SUBSTR(name, 1, 1)>'K', matches metadata
FILE1: nothing
FILE2: partially
FILE3: was already eliminated by the first predicate In this case, FILE1 is eliminated by the second predicate, and only FILE2 is in the set of files to be scanned, then the first predicate YEAR(birthday)>1980 can be removed from the query, since it completely matches all the files in the set of files to scan, i.e., FILE2.

Note that for each predicate/file combination, it can be determined that a file can match a predicate with the following results:
  "nothing"—we know for sure no records in the file match the predicate (e.g. "birthday<1950" for all files)
  "partially"—we know that some records in the file might match the predicate
  "completely"—we know that all records in the file match the predicate (e.g. "birthday>1950" for all files).

In an implementation, for every portion of data (such as a file) metadata may be tracked for the following types of metadata: min/max values, number of values, number of NULL values, and additional type-specific information available in the metadata.

Figure 7:
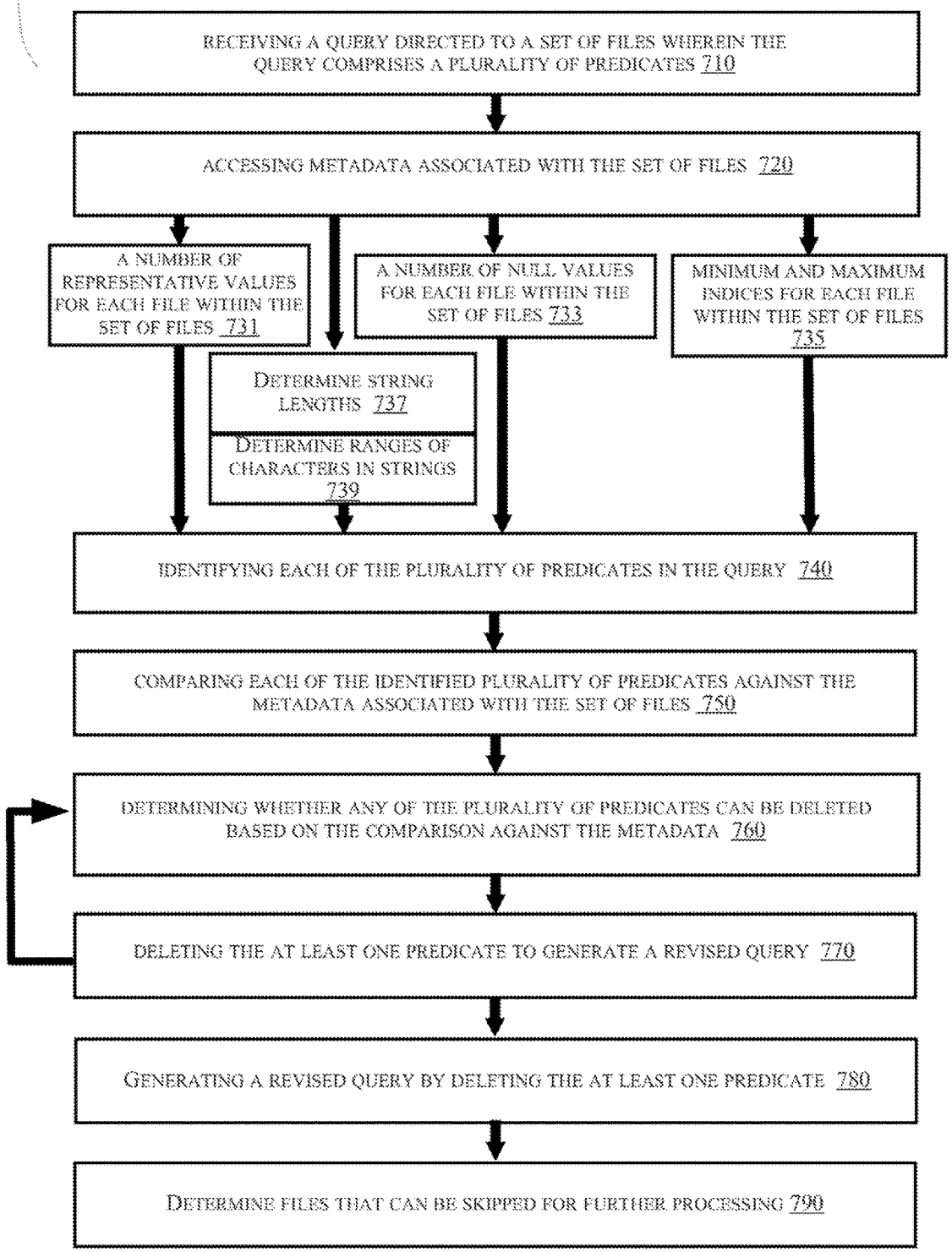
FIG. 7 is a flow diagram depicting an implementation of a method for the management of data storage and retrieval operations.

In an implementation, (as illustrated in FIG. 7) files containing string data, the length of the strings may be tracked, in addition to the range of characters within the strings. For example, in particular, if there are non-ASCII characters it may be desirable to be aware that ASCII reliant predicates should ignore the corresponding files. For example, with a predicate "WHERE name LIKE '%β%'" (note that "β" is a non-ASCII character) one can determine that a FILE1 and FILE3 can be eliminated as they only have ASCII characters. In the example of FIGS. 2A-2C, FILE2 of FIG. 2B, has non-ASCII characters in the name, and hence name_ascii is set to "no."

It will be appreciated that this can be applied also to complex expression and predicates. For all expressions (including functions) the method can propagate the metadata through the query tree. In the example of FIGS. 2A-2C, if it is known that the "birthdate" column has a range [1975-12-02 . . . 1983-03-08], then it follows that a function "YEAR (birthdate)" has a range [1975 . . . 1983]. So that in a query "WHERE YEAR(birthday)>1980" FILE3 can be eliminated. Similarly, arbitrary Boolean combinations of predicates can be used, e.g., with a filter "WHERE YEAR (birthday)>1980 AND name IS NULL", both FILE2 and FILE3 can be eliminated.

In an implementation, suppose a query based on the example files in FIGS. 2A-2C has the following predicate:
  WHERE YEAR(birthday)>1980
  AND LOWER(SUBSTR(name, 1, 3))='day'

Note that the metadata does not have any direct information about YEAR or lowercase values of the first two letters of the name. However, it is possible to determine this data using function-specific value range propagation.

For example: logic specific to function YEAR can determine that YEAR(birthday) for files is in the following ranges:

FILE1: 1975 . . . 1983
FILE2: 1983 . . . 1986
FILE3: 1971 . . . 1979

Based on that, logic specific to "greater than" function (">") can determine, that the result of comparison for "WHERE YEAR(birthday)>1980" for the files are as follows:

FILE1: partially
FILE2: completely
FILE3: nothing

Similarly, logic specific to functions LOWER and SUBSTR can determine that the value of LOWER(SUBSTR (name, 1, 3)) for files are as follows:

FILE1: "and" . . . "joh"
FILE2: "joh" . . . "thi"
FILE3: "cla" . . . "mat"

Again, logic specific to equality function determines, that the result of LOWER(SUBSTR(name, 1, 3))='day' for files is as follows:

FILE1: partially
FILE2: nothing
FILE3: partially

Finally, logic specific to function AND which receives results of both predicates for each file, can determine that the result of the entire predicate for the files is as follows:

FILE1: partially
FILE2: nothing
FILE3: nothing

Based on the above, it is known that only FILE1 partially matches the predicates, i.e., has records that possibly match the predicate, and needs to be scanned.

Further, in the above example, using the predicate YEAR (birthday)=1982, then after the predicate YEAR(birthday) =1982 has been computed, it is known that FILE3 already does not match this predicate. As a result, there is no need to compute the second predicate, AND LOWER(SUBSTR (name, 1, 3))='day', for FILE3.

In an implementation for DELETE queries, the method may additionally identify files where it is known that ALL tuples match the delete predicate, allowing very quick deletion of these files without having to analyze the data within them.

Further in the example files, if the user issues a query DELETE FROM persons WHERE birthdate>='1980-01-01' it follows that the system may accept all records from FILE2 immediately, while FILE1 needs to be analyzed record by record. Additionally, it follows that FILE3 doesn't need to be analyzed at all because it doesn't have any records possibly matching, but that is derived from the metadata as discussed above.

Accordingly, a revised or modified query may be generated during compilation, such that the revised or modified query can be used in additional iterations. The result may be an increase in efficiency as more predicates or sets of files are eliminated from processing.

In an implementation for JOIN queries, the system can use the found ranges of data on one side of the expression to convert into filters on the other side to further reduce/ optimize operational procedures. For example, two tables may be:

ORDERS(order_id, order_date)
LINEITEMS(order_id, item_name, price)
In the same example, a query may be expressed as:
SELECT SUM(price) FROM orders, lineitems
WHERE lineitem.order_id =orders.order_id
and order_date>='2014-01-01'

One skilled in the art may assume there is usually a correlation between order_id and order_date fields, after applying file pruning to the orders table (by exploiting metadata on order_date) it can be determined that the range of order_id values in the ORDERS table (e.g. assuming it's between example values 183198 and 218390). Accordingly, now this derived range can be applied as an extra selection on the LINEITEMS table, effectively converting the query to:

SELECT SUM(price) FROM orders, lineitems
WHERE lineitem.order_id=orders.order_id
and order_date>='2014-01-01'
and lineitem.order_id BETWEEN 183198 AND 218390

This potentially dramatically reduces the number of accessed files and the records in LINEITEMS, by pruning based on metadata (as discussed above).

It should be noted, that there are similar techniques performed at runtime, and after the ORDERS table is scanned during the join processing (assuming it's scanned first). Thus it should be noted that the solution is performed during compilation-time, and that it may be purely metadata-based.

In some implementations, the metadata may be used to determine the optimal physical types, eliminate predicates, simplify expressions, use direct addressing in hash tables etc.

Figure 4:
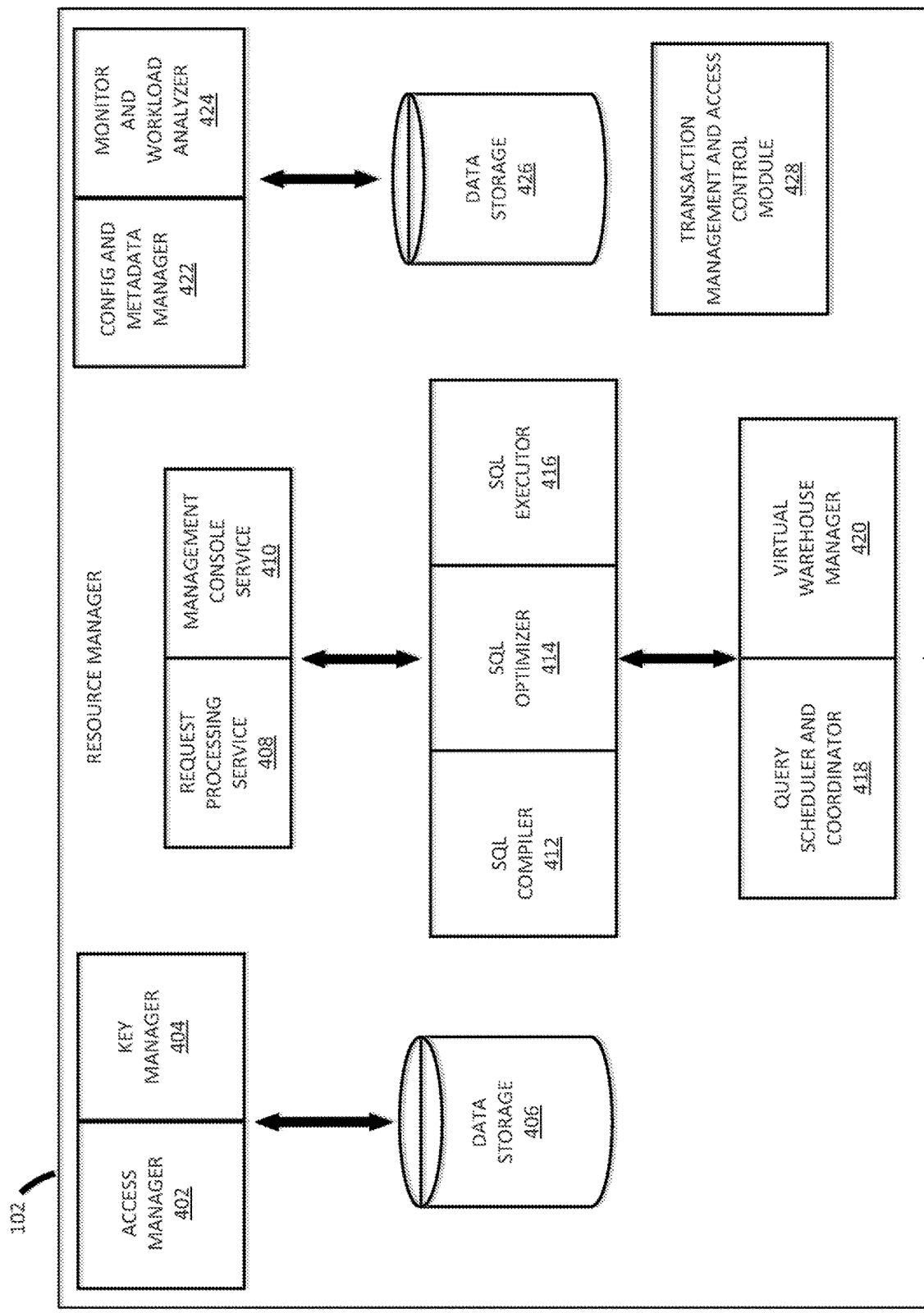
FIG. 4 illustrates a block diagram depicting an embodiment of an execution platform as disclosed herein.

FIG. 4 illustrates a block diagram depicting an embodiment of resource manager 102. As shown in FIG. 4, resource manager 102 includes an access manager 402 and a key manager 404 coupled to a data storage device 406. Access manager 402 handles authentication and authorization tasks for the systems described herein. Key manager 404 manages storage and authentication of keys used during authentication and authorization tasks. A request processing service 408 manages received data storage requests and data retrieval requests. A management console service 410 supports access to various systems and processes by administrators and other system managers.

Resource manager 102 also includes an SQL compiler 412, an SQL optimizer 414 and an SQL executor 416. SQL compiler 412 parses SQL queries and generates the execution code for the queries. SQL optimizer 414 determines the best method to execute queries based on the data that needs to be processed. SQL executor 416 executes the query code for queries received by resource manager 102. A query scheduler and coordinator 418 sends received queries to the appropriate services or systems for compilation, optimization, and dispatch to execution platform 112. A virtual warehouse manager 420 manages the operation of multiple virtual warehouses implemented in execution platform 112.

Additionally, resource manager 102 includes a configuration and metadata manager 422, which manages the information related to the data stored in the remote data storage devices and in the local caches. A monitor and workload analyzer 424 oversees the processes performed by resource manager 102 and manages the distribution of tasks (e.g., workload) across the virtual warehouses and execution nodes in execution platform 112. Configuration and metadata manager 422 and monitor and workload analyzer 424 are coupled to a data storage device 426.

Resource manager 102 also includes a transaction management and access control module 428, which manages the various tasks and other activities associated with the processing of data storage requests and data access requests. For example, transaction management and access control module 428 provides consistent and synchronized access to data by multiple users or systems. Since multiple users/systems may access the same data simultaneously, changes to the data must be synchronized to ensure that each user/system is working with the current version of the data. Transaction management and access control module 428 provides control of various data processing activities at a single, centralized location in resource manager 102.

Figure 5:
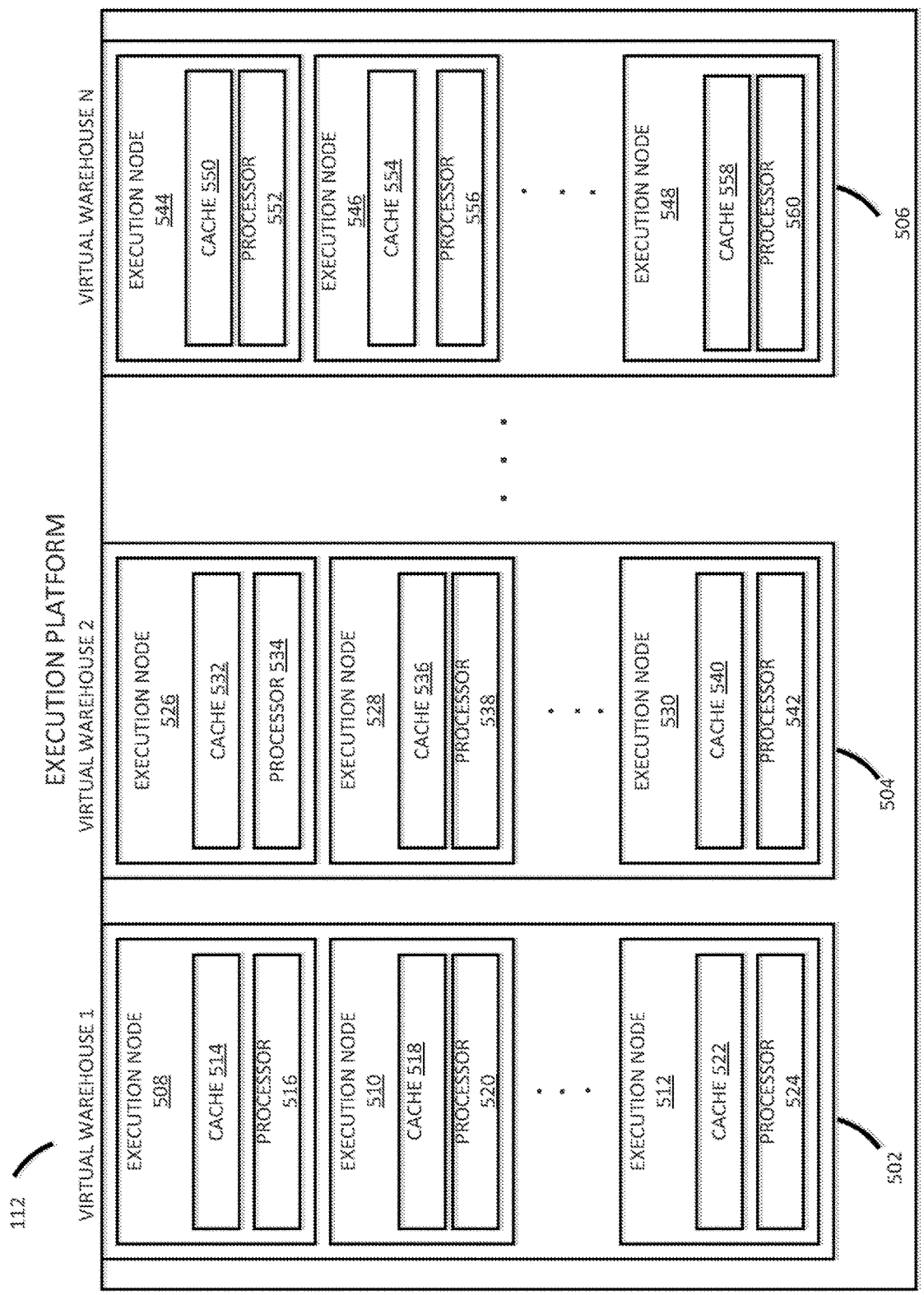
FIG. 5 is a block diagram depicting an example operating environment with multiple users accessing multiple databases through multiple virtual warehouses.

FIG. 5 is a block diagram depicting an embodiment of an execution platform 112. As shown in FIG. 5, execution platform 112 includes multiple virtual warehouses 502, 504, and 506. Each virtual warehouse includes multiple execution nodes that each include a cache and a processor. Although each virtual warehouse 502-506 shown in FIG. 5 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse 502-506 is capable of accessing any of the data storage devices 116-120 shown in FIG. 1. Thus, virtual warehouses 502-506 are not necessarily assigned to a specific data storage device 116-120 and, instead, can access data from any of the data storage devices 116-120. Similarly, each of the execution nodes shown in FIG. 5 can access data from any of the data storage devices 116-120. In some embodiments, a particular virtual warehouse or a particular execution node may be temporarily assigned to a specific data storage device, but the virtual warehouse or execution node may later access data from any other data storage device.

In the example of FIG. 5, virtual warehouse 502 includes three execution nodes 508, 510, and 512. Execution node 508 includes a cache 514 and a processor 516. Execution node 510 includes a cache 518 and a processor 520. Execution node 512 includes a cache 522 and a processor 524. Each execution node 508-512 is associated with processing one or more data storage and/or data retrieval tasks. For example, a particular virtual warehouse may handle data storage and data retrieval tasks associated with a particular user or customer. In other implementations, a particular virtual warehouse may handle data storage and data retrieval tasks associated with a particular data storage system or a particular category of data.

Similar to virtual warehouse 502 discussed above, virtual warehouse 504 includes three execution nodes 526, 528, and 530. Execution node 526 includes a cache 532 and a processor 534. Execution node 528 includes a cache 536 and a processor 538. Execution node 530 includes a cache 540 and a processor 542. Additionally, virtual warehouse 506 includes three execution nodes 544, 546, and 548. Execution node 544 includes a cache 550 and a processor 552. Execution node 546 includes a cache 554 and a processor 556. Execution node 548 includes a cache 558 and a processor 560.

Although the execution nodes shown in FIG. 5 each include one cache and one processor, alternate embodiments may include execution nodes containing any number of processors and any number of caches. Additionally, the caches may vary in size among the different execution nodes. The caches shown in FIG. 5 store, in the local execution node, data that was retrieved from one or more data storage devices in storage platform 114 (FIG. 1). Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in storage platform 114.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, a particular execution node may be assigned more processing resources if the tasks performed by the execution node become more processor intensive. Similarly, an execution node may be assigned more cache resources if the tasks performed by the execution node require a larger cache capacity.

Although virtual warehouses 502-506 are associated with the same execution platform 112, the virtual warehouses may be implemented using multiple computing systems at multiple geographic locations. For example, virtual warehouse 502 can be implemented by a computing system at a first geographic location, while virtual warehouses 504 and 506 are implemented by another computing system at a second geographic location. In some embodiments, these different computing systems are cloud-based computing systems maintained by one or more different entities.

Additionally, each virtual warehouse is shown in FIG. 5 as having multiple execution nodes. The multiple execution nodes associated with each virtual warehouse may be implemented using multiple computing systems at multiple geographic locations. For example, a particular instance of virtual warehouse 502 implements execution nodes 508 and 510 on one computing platform at a particular geographic location, and implements execution node 512 at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse. Execution platform 112 is also fault tolerant. For example, if one virtual warehouse fails, that virtual warehouse is quickly replaced with a different virtual warehouse at a different geographic location.

A particular execution platform 112 may include any number of virtual warehouses 502-506. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

Figure 6:
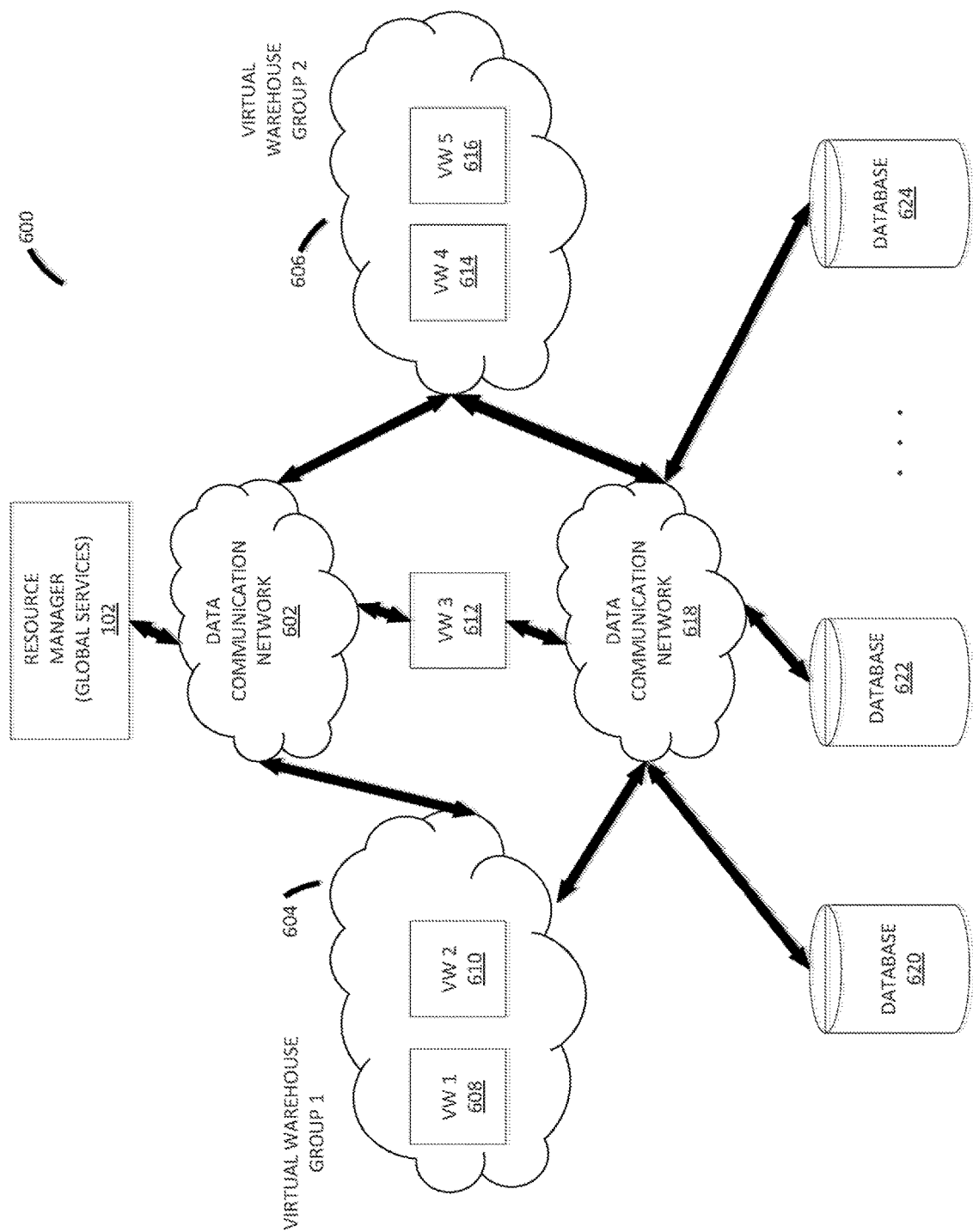
FIG. 6 is a block diagram depicting another example operating environment having multiple distributed virtual warehouses and virtual warehouse groups.

FIG. 6 illustrates a block diagram depicting another example operating environment 600 having multiple distributed virtual warehouses and virtual warehouse groups. Environment 600 includes resource manager 102 that communicates with virtual warehouse groups 604 and 606 through a data communication network 602. Warehouse group 604 includes two virtual warehouses 608 and 610, and warehouse group 606 includes another two virtual warehouses 614 and 616. Resource manager 102 also communicates with virtual warehouse 612 (which is not part of a virtual warehouse group) through data communication network 602.

Virtual warehouse groups 604 and 606 as well as virtual warehouse 612 communicate with databases 620, 622, and 624 through a data communication network 618. In some embodiments data communication networks 602 and 618 are the same network. Environment 600 allows resource manager 102 to coordinate user data storage and retrieval requests across the multiple virtual warehouses 608-616 to store and retrieve data in databases 620-624. Virtual warehouse groups 604 and 606 can be located in the same geographic area, or can be separated geographically. Additionally, virtual warehouse groups 604 and 606 can be implemented by the same entity or by different entities.

The systems and methods described herein allow data to be stored and accessed as a service that is separate from computing (or processing) resources. Even if no computing resources have been requested from the execution platform, data is available to a virtual warehouse without requiring reloading of the data from a remote data source. The described systems and methods are useful with any type of data. In particular embodiments, data is stored in a structured, optimized format. The decoupling of the data storage/access service from the computing services also simplifies the sharing of data among different users and groups. As discussed herein, each virtual warehouse can access any data to which it has access permissions, even at the same time as other virtual warehouses are accessing the same data. This architecture supports running queries without any actual data stored in the local cache. The systems and methods described herein are capable of transparent dynamic data movement, which moves data from a remote storage device to a local cache, as needed, in a manner that is transparent to the user of the system. Further, this architecture supports data sharing without prior data movement since any virtual warehouse can access any data due to the decoupling of the data storage service from the computing service.

FIG. 7 is a flow diagram depicting an implementation of a method 700 for managing data storage and retrieval operations. During use, method 700 of FIG. 7 may receive a query directed to a set of files at 710, and wherein the query may comprise a plurality of predicates. In an implementation, each set of files may have corresponding metadata therewith that may be accessed by a processor at 720.

At 731, representative values for each file within the set of files may be derived from the metadata. At 733, the number of null values may be derived from the metadata for each file within the set of files. At 735, maximum and minimum values may be read or derived from the metadata associated with each file in the set of files, thereby establishing a range of values that is representative of the data in the set of files. It will be appreciated that after performing the processes of 720, 731, 733, and 735, a large amount of information is known about each file within the set of files without actually accessing any of the files individually.

At 737, metadata in the form of string data may be used to determine the lengths of the strings of data in the file, and at 739, the range of characters of the strings may be identified. In an implementation, UNICODE-aware string operations are usually slower and more complex than those assuming ASCII-only data (7-bits) is represented in the files. In such a circumstance, if the values can be found to have pure ASCII characters, (or also UNICODE characters), then such information may be recorded in the metadata for later use in optimization schemes as discussed above.

Accordingly, in an implementation, where only ASCII characters are assumed, much faster string operations can be used. In the previous example of FIGS. 2A-2C, assume a query that computes the number of people with a given first two letters of a name:
    SELECT SUBSTR(name, 1, 2), COUNT(*) FROM persons
    GROUP BY SUBSTR(name, 1, 2)
Note that the SUBSTR operation on records from FILE1 and FILE3 can use a much faster implementation (assuming ASCII characters, where 1 byte is 1 character), while for FILE2 a slower implementation is used which is one that can handle Unicode.

In an implementing of a processing system that does not allow per-file choice of SUBSTR logic, for this query:
    SELECT SUBSTR(name, 1, 2), COUNT(*) FROM persons
    GROUP BY SUBSTR(name, 1, 2)
    WHERE birthdate<'1980-01-01'
It is known that only FILE1 and FILE3 qualify, and they all have only ASCII characters, and then a faster implementation can be used.

At 740, a plurality of predicates may be identified from the query and then compared to the metadata associated with each of the files within the set of files.

At 750, the plurality of predicates may be compared to the metadata values and ranges. Specific, example of the differing types of metadata will be discussed in greater detail below.

At 760, the metadata of the set of files may be compared to the plurality of predicates supplied with the query. As discussed below, if the predicates are not satisfied by the metadata, or fall within a range defined by the metadata, then the set of files can be ignored. Alternatively, if the predicates are satisfied by the metadata of all files, then the predicate may be deleted from the query at 770. As illustrated in the FIG. 7, the method may loop back to 760 for determining if additional predicates may be deleted before a revised query is generated, or may advance to 780 and generate and new query the reflects the expected deletion. At 790, it may be determined as to which files can be skipped for processing because of the revised query.

For example, if the metadata reveals that all values in a column "X" are greater than 7, a filtering process "WHERE X>7" may be removed, thereby saving computing resources because the actual files need not be processed. Additionally, if it is known that there are no null values in a set of files, the filter "IS NOT NULL" may be removed, thereby saving resources. In another implementation, it may be known that the column values are all within a range 0 . . . 1000, a 2-byte physical representation of that column may be used to simplify all the expressions regarding data from that column.

In an implementation, for every portion of data (such as a file) metadata may be tracked for the following types of metadata: min/max values, number of values, number of NULL values, and additional type-specific information available in the metadata.

In an implementation, (as illustrated in FIG. 7) files containing string data, the length of the strings may be tracked, in addition to the range of characters within the strings. For example, in particular, if there are non-ASCII characters it may be desirable to be aware that ASCII reliant predicates should ignore the corresponding files. In our example, FILE2 of FIG. 2B, has non-ASCII characters in name, and hence name_ascii is set to "no."

This can be applied also to complex expression and predicates. For all expressions (including functions) the method can propagate the metadata through the query tree.

In our example, if it is known that the "birthdate" column has a range [1975-12-02 . . . 1983-03-08], then it follows that a function "YEAR(birthdate)" has a range [1975 . . . 1983]. So that in a query "WHERE YEAR(birthday) >1980" FILE3 can be eliminated.

In an implementation for DELETE queries, the method may additionally identify files where it is known that ALL tuples match the delete predicate, allowing very quick deletion of these files without having to analyze the data within them.

Further in the example files, if the user issues a query DELETE FROM persons WHERE birthdate>='1980-01-01' it follows that the system may drop FILE2 immediately, while FILE1 needs to be analyzed record by record. Additionally, it follows that FILE3 doesn't need to be analyzed at all because it doesn't have any records possibly matching, but that is derived from the metadata as discussed above.

Accordingly, a revised or modified query may be generated during compilation, at 780, such that the revised or modified query can be used in additional iterations which results in increasing efficiency as more predicates or the set of files are eliminated from processing. For example, a revised or modified query may be generated that omits predicates that will not be found within the files to be queried, thereby conserving processing resources needed as the query is further executed.

Figure 8:
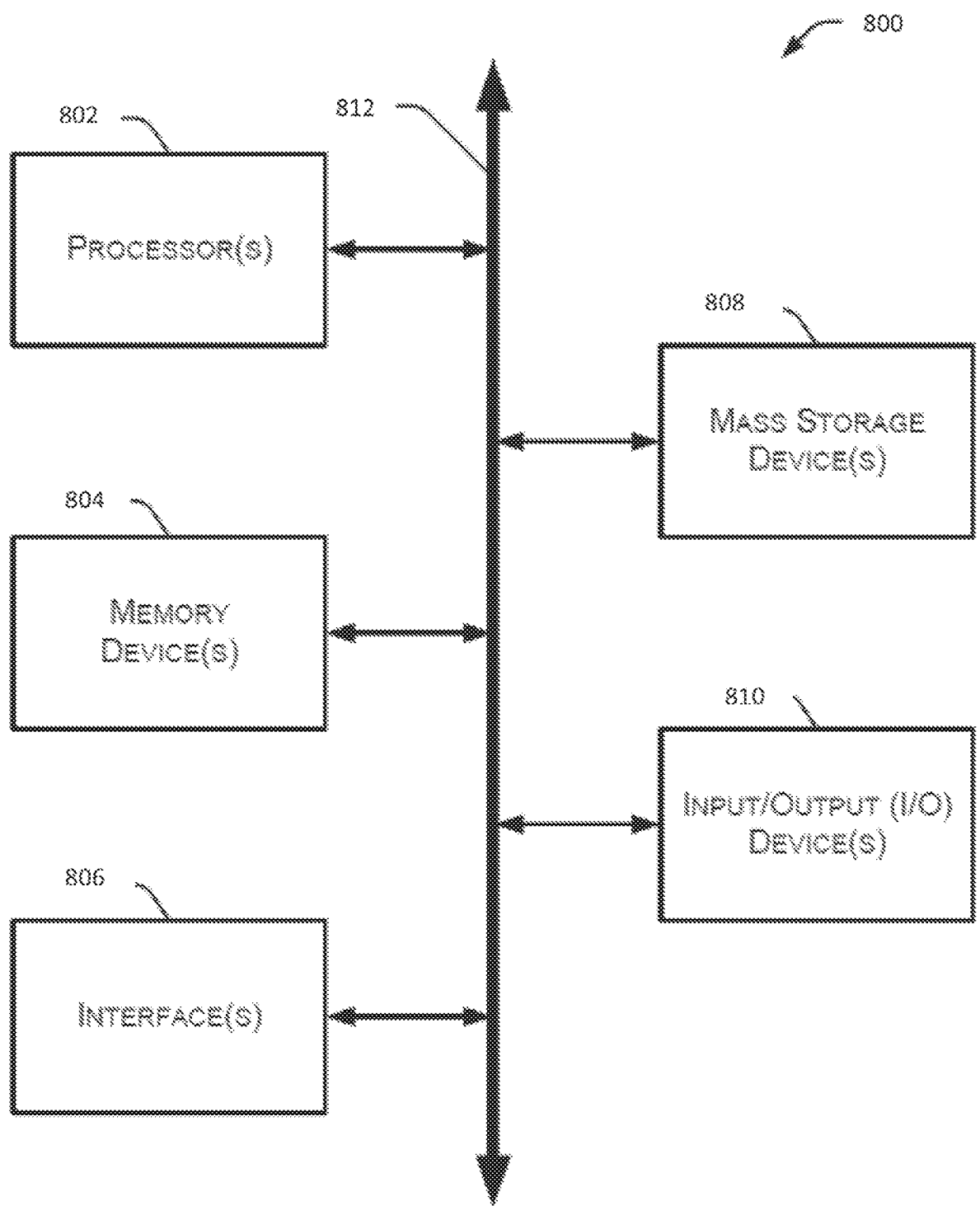
FIG. 8 is a block diagram depicting an example computing device consistent with the enabling disclosure of the computer processes taught herein.

FIG. 8 is a block diagram depicting an example computing device 800. In some embodiments, computing device 800 is used to implement one or more of the systems and components discussed herein. For example, computing device 800 may allow a user or administrator to access resource manager 102. Further, computing device 800 may interact with any of the systems and components described herein. Accordingly, computing device 800 may be used to perform various procedures and tasks, such as those discussed herein. Computing device 800 can function as a server, a client or any other computing entity. Computing device 800 can be any of a wide variety of computing devices, such as a desktop computer, a notebook computer, a server computer, a handheld computer, a tablet, and the like.

Computing device 800 includes one or more processor(s) 802, one or more memory device(s) 804, one or more interface(s) 806, one or more mass storage device(s) 808, and one or more Input/Output (I/O) device(s) 810, all of which are coupled to a bus 812. Processor(s) 802 include one or more processors or controllers that execute instructions stored in memory device(s) 804 and/or mass storage device(s) 808. Processor(s) 802 may also include various types of computer-readable media, such as cache memory.

Memory device(s) 804 include various computer-readable media, such as volatile memory (e.g., random access memory (RAM)) and/or nonvolatile memory (e.g., read-only memory (ROM)). Memory device(s) 804 may also include rewritable ROM, such as Flash memory.

Mass storage device(s) 808 include various computer readable media, such as magnetic tapes, magnetic disks, optical disks, solid state memory (e.g., Flash memory), and so forth. Various drives may also be included in mass storage device(s) 808 to enable reading from and/or writing to the various computer readable media. Mass storage device(s) 808 include removable media and/or non-removable media.

I/O device(s) 810 include various devices that allow data and/or other information to be input to or retrieved from computing device 800. Example I/O device(s) 810 include cursor control devices, keyboards, keypads, microphones, monitors or other display devices, speakers, printers, network interface cards, modems, lenses, CCDs or other image capture devices, and the like.

Interface(s) 806 include various interfaces that allow computing device 800 to interact with other systems, devices, or computing environments. Example interface(s) 806 include any number of different network interfaces, such as interfaces to local area networks (LANs), wide area networks (WANs), wireless networks, and the Internet.

Bus 812 allows processor(s) 802, memory device(s) 804, interface(s) 806, mass storage device(s) 808, and I/O device(s) 810 to communicate with one another, as well as other devices or components coupled to bus 812. Bus 812 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 800, and are executed by processor(s) 802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. Accordingly, as used herein the term "module" is intended to represent computer hardware, firmware, and software, alone or in combination, for the purposes of performing all or parts of query operations.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A system comprising:
    a metadata store to store metadata; and
    a processor, operatively coupled with the metadata store, configured to:
        manage database data into a plurality of partitions of subsets of the database data, wherein the subsets of the database data correspond to sets of files, wherein, for each of the plurality of partitions, the metadata stored in the metadata includes metadata corresponding to multiple columns of the database data and a plurality of different types of partition ranges that characterize at least one of the plurality of partitions;
receive a query comprising a plurality of clauses;
identify, from the plurality of partitions, one or more of the subsets of the database data that do not satisfy a condition of at least one of the plurality of clauses to create a pruned set of partitions, wherein to identify the one or more subsets of the database data comprises using a value from the metadata associated with each file in the sets of files to establish a range of values representative of data in the sets of files; and
use the pruned set of partitions to execute the query.

2. The system of claim 1, wherein to identify the one or more subsets of the database data is by reading the metadata stored in the metadata store.

3. The system of claim 1, wherein to identify the one or more of the subsets of the database data, the processor is further configured to:
identify a partition to be pruned without accessing the data comprising the partition.

4. The system of claim 3, wherein to identify the partition that does not satisfy at least one of the conditions, the processor is further configured to:
read the metadata pertaining to the partition, wherein the metadata is stored in the metadata store.

5. The system of claim 1, wherein the metadata includes a minimum and maximum value for each of the multiple columns of the database data and each of the plurality of partitions.

6. The system of claim 1, wherein each partition of the plurality of partitions comprises a discrete selection of the database data.

7. The system of claim 6, wherein the processor is further configured to:
generate the metadata comprising information for each partition; and
store the metadata in the metadata store separate from the partition.

8. The system of claim 2, wherein to read the metadata, the processor is further configured to:
determine, based on the metadata, a range of one or more values of database data stored in one of the partitions; and
determine whether any data within the range of one or more values of database data stored in the one partition satisfies the condition of at least one of the plurality of clauses.

9. The system of claim 8, wherein the determining whether each of the plurality of partitions, satisfies the condition of at least one of the plurality of clauses is based on at least a determination that some data within the range of one or more values stored in the certain partition satisfies the condition of at least one of the plurality of clauses.

10. The system of claim 1, wherein the processor is further configured to identify at least one column within each of the plurality of partitions that comprises database data satisfying the condition of at least one of the plurality of clauses.

11. The system of claim 1, wherein the one or more of the subsets of the database data that do not satisfy a condition of at least one of the plurality of clauses are not used during execution of the query.

12. A method comprising:
managing database data into a plurality of partitions of subsets of the database data, wherein the subsets of the database data correspond to sets of files, wherein, for each of the plurality of partitions, metadata stored in the metadata includes metadata corresponding to multiple columns of the database data and a plurality different types of partition ranges that characterize at least one of the plurality of partitions;
receiving a query comprising a plurality of clauses;
identifying, from the plurality of partitions, one or more of the subset of the database that do not satisfy a condition of at least one of the plurality of clauses to create a pruned set of partitions, wherein identifying the one or more subsets of the database data comprises using a value from the metadata associated with each file in the sets of files to establish a range of values representative of data in the sets of files; and
using the pruned set of partitions to execute the query.

13. The method of claim 12, wherein identifying the one or more subsets of the database data comprises reading the metadata stored in the metadata store.

14. The method of claim 12, wherein identifying the one or more subsets of the database data comprises:
identifying a partition to be pruned without accessing the data comprising the partition.

15. The method of claim 14, wherein identifying the inapplicable partitions comprises:
reading the metadata pertaining to each of the partitions, the metadata is stored in the metadata store.

16. The method of claim 12, wherein the metadata includes a minimum and maximum value for each of the multiple columns of the database data and each of the plurality of partitions.

17. The method of claim 12, wherein each partition of the plurality of partitions comprises a discrete selection of the database data.

18. The method of claim 17, further comprising:
generating the metadata comprising information for each partition; and
storing the metadata in the metadata store separate from the partition.

19. The method of claim 13, wherein reading the metadata comprises:
determining, based on the metadata, a range of one or more values of database data stored in one of the partitions; and
determining whether any data within the range of one or more values of database data stored in the one partition satisfies the condition of at least one of the plurality of clauses.

20. The method of claim 19, wherein the determining whether each of the plurality of partitions comprises:
determining that a certain partition satisfies the condition of at least one of the plurality of clauses is based on at least a determination that some data within the range of one or more values stored in the certain partition satisfies the condition of at least one of the plurality of clauses.

21. The method of claim 20, wherein identifying the one or more applicable partitions comprises identifying the certain file as being an applicable file in response to a determination that some data within the range of one or more values stored in the certain file satisfies the condition of at least one of the plurality of clauses.

22. The method of claim 12, wherein the one or more of the subsets of the database data that do not satisfy a condition of at least one of the plurality of clauses are not used during execution of the query.

23. A non-transitory computer readable storage media, programmable to execute instructions that, when executed by a processor, cause the processor to:
- manage database data into a plurality of partitions of subsets of the database data, wherein the subsets of the database data correspond to sets of files, wherein, for each of the plurality of partitions, metadata stored in the metadata includes metadata corresponding to multiple columns of the database data and a plurality of different types of partition ranges that characterize at least one of the plurality of partitions;
- receive a query comprising a plurality of clauses;
- identify, from the plurality of partitions, one or more of the subsets of the database data that does not satisfy the condition of at least one of the plurality of clauses to create a pruned set of partitions, wherein to identify the one or more subsets of the database data comprises using a value from the metadata associated with each file in the sets of files to establish a range of values representative of data in the sets of files; and
- use the pruned set of partitions to execute the query.

24. The non-transitory computer readable storage media of claim 23, wherein to identify the one or more subsets of the database data is by reading the metadata stored in the metadata store.

* * * * *